(12) United States Patent
Abrahams et al.

(10) Patent No.: US 11,151,999 B2
(45) Date of Patent: Oct. 19, 2021

(54) CONTROLLING EXTERNAL BEHAVIOR OF COGNITIVE SYSTEMS

(71) Applicant: International Business Machines Corporation, Armonk, NY (US)

(72) Inventors: Faried Abrahams, Laytonsville, MD (US); Gandhi Sivakumar, Bentleigh (AU); Lalit Agarwalla, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 126 days.

(21) Appl. No.: 16/528,876

(22) Filed: Aug. 1, 2019

(65) Prior Publication Data

US 2021/0035573 A1  Feb. 4, 2021

(51) Int. Cl.
*G10L 15/22* (2006.01)
*G06K 9/00* (2006.01)
*G06F 3/01* (2006.01)
*G06F 40/35* (2020.01)

(52) U.S. Cl.
CPC .............. *G10L 15/22* (2013.01); *G06F 3/017* (2013.01); *G06F 40/35* (2020.01); *G06K 9/00335* (2013.01); *G10L 2015/225* (2013.01); *G10L 2015/228* (2013.01)

(58) Field of Classification Search
USPC ................ 704/246, 247, 251, 252, 270, 271
See application file for complete search history.

(56) References Cited

U.S. PATENT DOCUMENTS

| | | | |
|---|---|---|---|
| 7,598,942 B2 | 10/2009 | Underkoffler et al. | |
| 8,473,443 B2 | 6/2013 | Sheena | |
| 9,697,198 B2 | 7/2017 | Davis Jones | |
| 10,073,842 B2 | 9/2018 | Faried | |
| 10,764,534 B1* | 9/2020 | Shevchenko | G06F 40/253 |
| 10,771,529 B1* | 9/2020 | Shevchenko | G06F 9/453 |
| 10,922,483 B1* | 2/2021 | Shevchenko | G06F 40/20 |
| 2016/0164813 A1* | 6/2016 | Anderson | H04L 51/32 709/206 |
| 2017/0162197 A1* | 6/2017 | Cohen | G06F 3/167 |
| 2018/0174020 A1 | 6/2018 | Xianchao | |
| 2018/0343219 A1* | 11/2018 | Anderson | H04L 51/20 |
| 2019/0019507 A1 | 1/2019 | Faried | |
| 2020/0035260 A1* | 1/2020 | Whitman | G10L 15/18 |
| 2020/0065382 A1* | 2/2020 | Biazetti | G06F 40/30 |
| 2020/0065728 A1* | 2/2020 | Wilson | G06N 20/00 |
| 2020/0162616 A1* | 5/2020 | Bender | H04M 3/569 |
| 2020/0351225 A1* | 11/2020 | Lenchner | G06N 3/0445 |

FOREIGN PATENT DOCUMENTS

| WO | 03/058518 | 7/2003 |
|---|---|---|
| WO | 2008000046 | 1/2008 |

OTHER PUBLICATIONS

Wachs et al., "Vision-based hand-gesture applications," Communications of the ACM, v.54, No. 2, Feb. 2011, pp. 60-71.

* cited by examiner

*Primary Examiner* — Leonard Saint Cyr
(74) *Attorney, Agent, or Firm* — VanLeeuwen & VanLeeuwen; Christopher M. Pignato

(57) ABSTRACT

An approach is provided in which a cognitive system engages in a conversation that includes multiple participants. The cognitive system detects a diversion indicator during the conversation that is a trigger to the cognitive system perform a diversion action. The cognitive system identifies the diversion action that corresponds to the diversion indicator and performs the diversion action during the conversation accordingly.

13 Claims, 8 Drawing Sheets

| Diversion Preferences Table 500 | | |
|---|---|---|
| Diversion Indicator | Diversion Action | Platform API |
| Finger on the mouth gesture | Stop Conversing | (Audio output, Flag Type = Pause, Time = 3 minutes) |
| "Stop verbose" verbal queue | Decrease verboseness | (Verbose 2) |
| Laugh slowly emoticon | Reduce tone | (Audio Output, Decibel = low) |
| "Switch topic to travel" text | Switch topic | Switch to Travel shortfall module (Audio output = Text from Travel) |
| Increased pulse | Reduce tone | (Audio output = Decibel = low) |

550 — Finger on the mouth gesture row
560 — "Stop verbose" verbal queue row
570 — Laugh slowly emoticon row
580 — "Switch topic to travel" text row
590 — Increased pulse row 520 — Diversion Indicator column
530 — Diversion Action column
540 — Platform API column

*FIG. 5*

CONTROLLING EXTERNAL BEHAVIOR OF COGNITIVE SYSTEMS

BACKGROUND

Industry trends are moving towards "cognitive models" that are expected to interact with humans in a natural manner. Cognitive modeling is an area of computer science that simulates human problem-solving and mental processing. Cognitive modeling is used in numerous artificial intelligence (AI) applications, such as expert systems, natural language processing, neural networks, and in virtual reality applications.

Reinforcement learning is an increasingly prominent area of cognitive modeling that uses algorithms to run through many iterations of a task that takes multiple steps. Reinforcement learning incentivizes actions that produce positive outcomes and penalizes actions that lead to negative outcomes. These models, which can also be used in natural language processing and smart assistant applications, have improved human-computer interaction and make it possible for machines to have rudimentary conversations with humans.

BRIEF SUMMARY

According to one embodiment of the present disclosure, an approach is provided in which a cognitive system engages in a conversation that includes multiple participants. The cognitive system detects a diversion indicator during the conversation that is a trigger to the cognitive system perform a diversion action. The cognitive system identifies the diversion action that corresponds to the diversion indicator and performs the diversion action during the conversation accordingly.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present disclosure, as defined solely by the claims, will become apparent in the non-limiting detailed description set forth below.

BRIEF DESCRIPTION OF THE SEVERAL VIEWS OF THE DRAWINGS

The present disclosure may be better understood, and its numerous objects, features, and advantages made apparent to those skilled in the art by referencing the accompanying drawings, wherein:

FIG. 5 is an exemplary diagram depicting a diversion table with diversion indicators and corresponding diversion actions;

DETAILED DESCRIPTION

Figure 1:
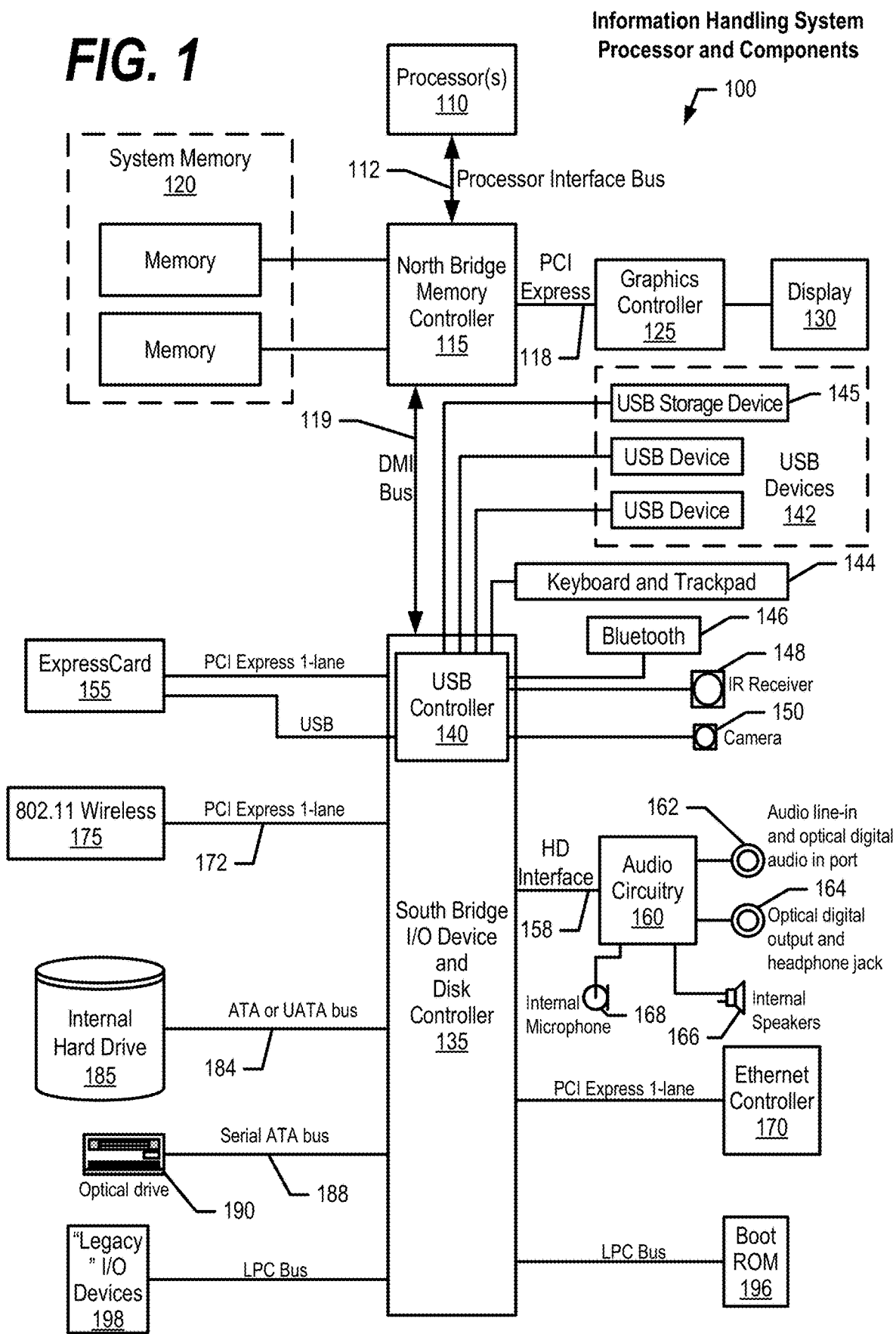
FIG. 1 is a block diagram of a data processing system in which the methods described herein can be implemented.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. The following detailed description will generally follow the summary of the disclosure, as set forth above, further explaining and expanding the definitions of the various aspects and embodiments of the disclosure as necessary.

FIG. 1 illustrates information handling system 100, which is a simplified example of a computer system capable of performing the computing operations described herein. Information handling system 100 includes one or more processors 110 coupled to processor interface bus 112. Processor interface bus 112 connects processors 110 to Northbridge 115, which is also known as the Memory Controller Hub (MCH). Northbridge 115 connects to system memory 120 and provides a means for processor(s) 110 to access the system memory. Graphics controller 125 also connects to Northbridge 115. In one embodiment, Peripheral Component Interconnect (PCI) Express bus 118 connects Northbridge 115 to graphics controller 125. Graphics controller 125 connects to display device 130, such as a computer monitor.

Northbridge 115 and Southbridge 135 connect to each other using bus 119.

In some embodiments, the bus is a Direct Media Interface (DMI) bus that transfers data at high speeds in each direction between Northbridge 115 and Southbridge 135. In some embodiments, a PCI bus connects the Northbridge and the Southbridge. Southbridge 135, also known as the Input/Output (I/O) Controller Hub (ICH) is a chip that generally implements capabilities that operate at slower speeds than the capabilities provided by the Northbridge. Southbridge 135 typically provides various busses used to connect various components. These busses include, for example, PCI and PCI Express busses, an ISA bus, a System Management Bus (SMBus or SMB), and/or a Low Pin Count (LPC) bus. The LPC bus often connects low-bandwidth devices, such as boot ROM 196 and "legacy" I/O devices (using a "super I/O" chip). The "legacy" I/O devices (198) can include, for example, serial and parallel ports, keyboard, mouse, and/or a floppy disk controller. Other components often included in Southbridge 135 include a Direct Memory Access (DMA) controller, a Programmable Interrupt Controller (PIC), and a storage device controller, which connects Southbridge 135 to nonvolatile storage device 185, such as a hard disk drive, using bus 184.

ExpressCard 155 is a slot that connects hot-pluggable devices to the information handling system. ExpressCard 155 supports both PCI Express and Universal Serial Bus (USB) connectivity as it connects to Southbridge 135 using both the USB and the PCI Express bus. Southbridge 135 includes USB Controller 140 that provides USB connectivity to devices that connect to the USB. These devices include webcam (camera) 150, infrared (IR) receiver 148, keyboard and trackpad 144, and Bluetooth device 146, which provides for wireless personal area networks (PANs). USB Controller 140 also provides USB connectivity to other miscellaneous USB connected devices 142, such as a mouse, removable nonvolatile storage device 145, modems, network cards, Integrated Services Digital Network (ISDN) connectors, fax, printers, USB hubs, and many other types of USB connected devices. While removable nonvolatile storage device 145 is shown as a USB-connected device, removable nonvolatile storage device 145 could be connected using a different interface, such as a Firewire interface, etcetera.

Wireless Local Area Network (LAN) device 175 connects to Southbridge 135 via the PCI or PCI Express bus 172. LAN device 175 typically implements one of the Institute of Electrical and Electronic Engineers (IEEE) 802.11 standards of over-the-air modulation techniques that all use the same protocol to wireless communicate between information handling system 100 and another computer system or device. Optical storage device 190 connects to Southbridge 135 using Serial Analog Telephone Adapter (ATA) (SATA) bus 188. Serial ATA adapters and devices communicate over a high-speed serial link. The Serial ATA bus also connects Southbridge 135 to other forms of storage devices, such as hard disk drives. Audio circuitry 160, such as a sound card, connects to Southbridge 135 via bus 158. Audio circuitry 160 also provides functionality associated with audio hardware such as audio line-in and optical digital audio in port 162, optical digital output and headphone jack 164, internal speakers 166, and internal microphone 168. Ethernet controller 170 connects to Southbridge 135 using a bus, such as the PCI or PCI Express bus. Ethernet controller 170 connects information handling system 100 to a computer network, such as a Local Area Network (LAN), the Internet, and other public and private computer networks.

While FIG. 1 shows one information handling system, an information handling system may take many forms. For example, an information handling system may take the form of a desktop, server, portable, laptop, notebook, or other form factor computer or data processing system. In addition, an information handling system may take other form factors such as a personal digital assistant (PDA), a gaming device, Automated Teller Machine (ATM), a portable telephone device, a communication device or other devices that include a processor and memory.

Figure 2:
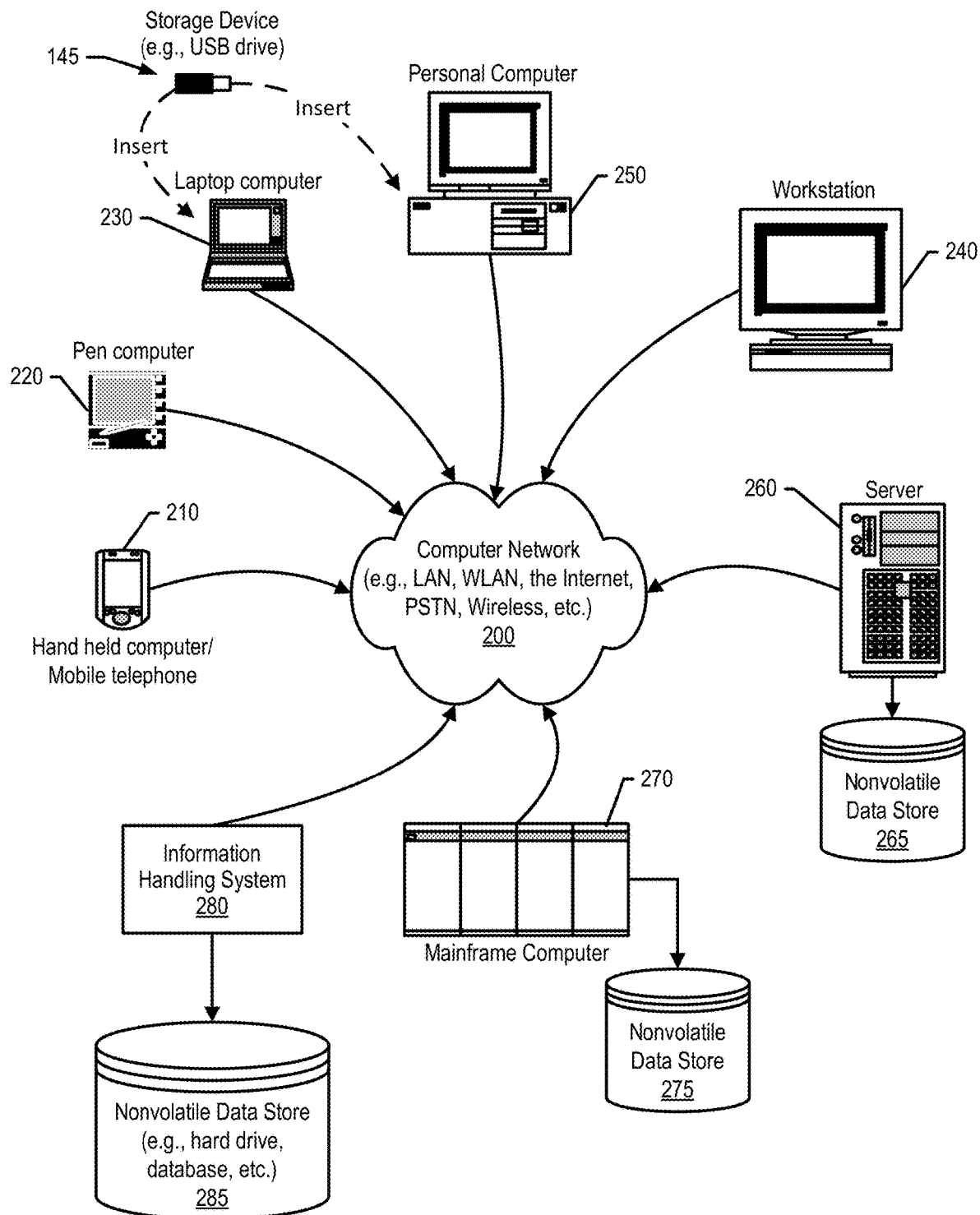
FIG. 2 provides an extension of the information handling system environment shown in FIG. 1 to illustrate that the methods described herein can be performed on a wide variety of information handling systems which operate in a networked environment.

FIG. 2 provides an extension of the information handling system environment shown in FIG. 1 to illustrate that the methods described herein can be performed on a wide variety of information handling systems that operate in a networked environment. Types of information handling systems range from small handheld devices, such as handheld computer/mobile telephone 210 to large mainframe systems, such as mainframe computer 270. Examples of handheld computer 210 include personal digital assistants (PDAs), personal entertainment devices, such as Moving Picture Experts Group Layer-3 Audio (MP3) players, portable televisions, and compact disc players. Other examples of information handling systems include pen, or tablet, computer 220, laptop, or notebook, computer 230, workstation 240, personal computer system 250, and server 260. Other types of information handling systems that are not individually shown in FIG. 2 are represented by information handling system 280. As shown, the various information handling systems can be networked together using computer network 200. Types of computer network that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. The embodiment of the information handling system shown in FIG. 2 includes separate nonvolatile data stores (more specifically, server 260 utilizes nonvolatile data store 265, mainframe computer 270 utilizes nonvolatile data store 275, and information handling system 280 utilizes nonvolatile data store 285). The nonvolatile data store can be a component that is external to the various information handling systems or can be internal to one of the information handling systems. In addition, removable nonvolatile storage device 145 can be shared among two or more information handling systems using various techniques, such as connecting the removable nonvolatile storage device 145 to a USB port or other connector of the information handling systems.

As discussed above, with the industry moving towards cognitive technologies, cognitive interfaces are designed to possess human like characteristics to interact with humans in various ways, both in official and personal environments. At times, normal human conversations venture off-topic and can lead to inappropriate conversations based on topic, environment, or a combination of both. When this occurs, one of the conversation participants may non-verbally hint to change the discussion topic, such as by performing a silent gesture. There is need to have similar mechanism in cognitive interfaces so that the cognitive interface understands non-verbal hints through various mechanisms to be silent or change conversation topics.

FIGS. 3 through 8 depict an approach that can be executed on an information handling system that implements a cognitive system that defines a hierarchy of control participants in a group conversation based on, for example, organizational data. The cognitive system stores diversion preferences for different control participants such as their preferred gestures, preferred verboseness, preferred text/emoticon indicators, preferred device prompts, and also associates training media frames for the defined gestures. In addition, the cognitive system defines various types of actions such as (i) hard stop actions, (ii) return to an autonomous state until further trigger, and (iii) switch topics automatically or through command choices (e.g., a user can specify which topic to switch). The cognitive system also utilizes a machine learning model to learn from identified behavior characteristics.

Figure 3:
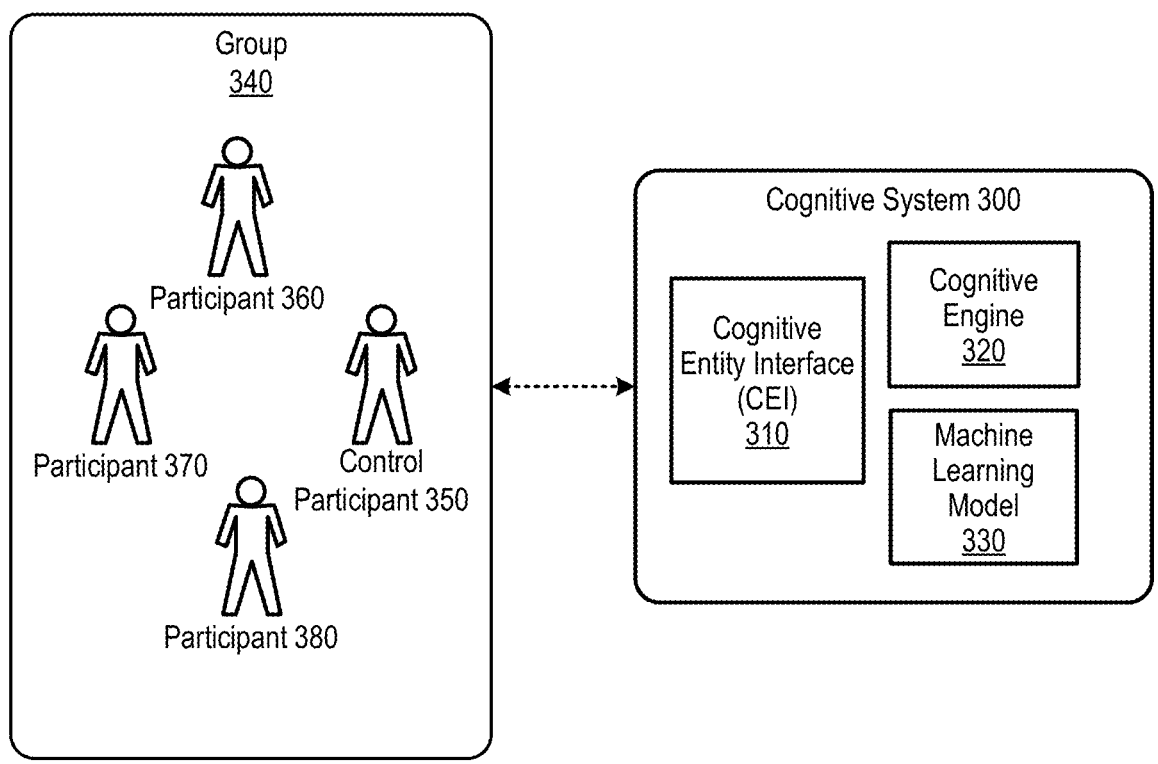
FIG. 3 is an exemplary diagram depicting a cognitive system interacting with a group of participants.

FIG. 3 is an exemplary diagram depicting a cognitive system interacting with a group of participants. Cognitive system 300 includes cognitive entity interface (CEI) 310, cognitive engine 320, and machine learning model 330. Cognitive entity interface 310 includes, in one embodiment, a display, a speaker, a microphone, a camera, and any other component to interface with group 340. Cognitive engine 320 performs the cognitive activity as discussed herein, and machine learning model 330 refines cognitive engine 320 and its cognitive database over time.

When participants 350, 360, 370, and 380 in group 340 begins a conversation, cognitive system 300 identifies a control participant of group 340 (control participant 350) using techniques such as external image recognition (e.g., gesture and voice based control) and/or authentication based recognition (e.g., text, emoticon, remote control). In one embodiment, cognitive system 300 identifies control participant 350 based on an organizational hierarchy and/or pre-defined control participant information. In non-organizational based environments, in one embodiment, cognitive system 300 allows group 340 to choose the control participant 350 and store diversion preferences for each group participant (e.g., gestures, voice commands, text commands, etc.).

During group 340's conversation, cognitive system 300 includes multiple mechanisms to detect hints from control participant 350 to change conversation topics or remain silent, such as receiving voice commands, detecting gestures, detecting remote control commands, etc. (see FIG. 4 and corresponding text for further details). For example, control participant 350 may politely interject voice commands into the conversation to instruct cognitive system 300 to divert the conversation. Cognitive system 300 detects the voice commands and takes appropriate actions according to the hint (e.g., remain silent, change topics, etc.). In one embodiment, control participant 350 performs a gesture that cognitive system 300 uses a camera to visually recognize. For example, control participant 350 may position a finger in front of control participant 350's mouth to instruct cognitive system 300 to remain silent. In another embodiment, control participant 350 presses a button on a device (e.g., a remote control) to hint to cognitive system 300 to perform a diversion action such as changing conversation topics.

In another embodiment, cognitive system 300 uses a conversation appropriateness list of conversations based on the group environment. For example, the list may indicate that discussing finances is appropriate during a business meeting conversation, but is inappropriate during an informal gathering conversation.

Figure 4:
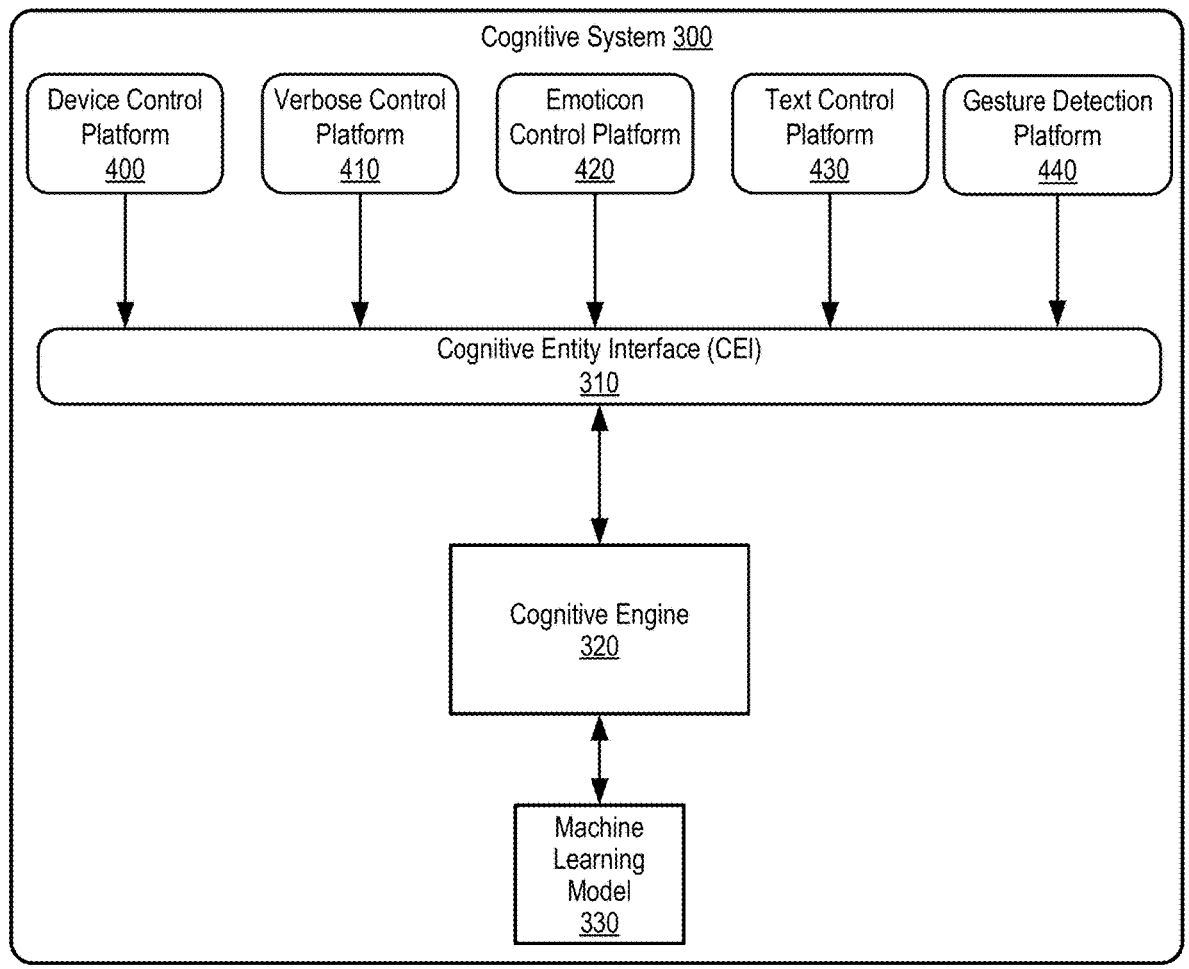
FIG. 4 is an exemplary diagram depicting a cognitive system that receives inputs from various platforms.

FIG. 4 is an exemplary diagram depicting a cognitive system that uses various platforms to receive information. In one embodiment, cognitive system 300 receives training data, such as gesture training data, voice recognition training data, etc., through an LDAP (lightweight directory access protocol) or custom defined hierarchy. Then, during operation, cognitive system 300 monitors conversations via cognitive entity interface 310 through device control platform 400, verbose control platform 410, emoticon control platform 420, text control platform 430, and/or gesture detection platform 440.

Device control platform 400, in one embodiment, monitors remote control signals from a remote control that control participant 350 manages and performs actions accordingly. For example, the remote control may have a "silence" button and a "change topics" button and cognitive system 300 processes the selections accordingly. Verbose control platform 410 monitors the verboseness level of the cognitive system and performs adjustments based on input from control participant 350. For example, if control participant 350 determines that cognitive system 300 is too verbose (using too many words to express an opinion), control participant 350 performs a diversion indicator to reduce the verboseness level of cognitive system 300.

Emoticon control platform 420 receives emoticons from control participant 350, such as through a mobile device. Cognitive system 300 then looks up a diversion action that corresponds to the received emoticon and performs the action accordingly. Text control platform 430 receives text messages from control participant 350, such as through a mobile device. Cognitive system 300 then looks up a diversion action that corresponds to the received text message and performs the action accordingly. For example, the text may say "switch topic to travel" and, in this example, cognitive system 300 switches the conversation to a travel related conversation. Gesture detection platform 440 monitors control participant 350's gestures (e.g., hand movements, head movements, etc.) and performs diversion actions accordingly.

FIG. 5 is an exemplary diagram depicting a diversion table with diversion indicators and corresponding diversion actions. Diversion preferences table 500 includes columns 520, 530, and 540. Column 520 includes a list of diversion indicators for which cognitive system 300 monitors. In one embodiment, diversion indicators take one or more of the following forms: (i) a remote control signal, (ii) a verbal queue, (iii) an emoticon, (iv) a text message, (v) a gesture, and/or (vi) a biometric measurement (e.g., a pulse measurement, eye dilation, etc.).

Column 530 includes a list of diversion actions to perform based on one of the diversion indicators in column 520. And, column 540 includes a list of platform APIs to perform the action.

Row 550 shows that when control participant 350 performs a finger on the mouth gesture (e.g., a "shush" gesture), cognitive system 300 stops conversing and remains silent. Row 560 shows that when cognitive system 300 detects a stop verbose verbal queue, such as "reduce word count", cognitive system 300 decreases the amount of expression when participating in a conversation. Row 570 shows that when cognitive system 300 detects a "laugh slowly" emoticon, cognitive system 300 reduces its tone. Row 580 shows that when cognitive system 300 receives a text to switch topic to "travel", cognitive system 300 starts discussing travel topics. And, row 590 shows that when cognitive system 300 detects an increased pulse of control participant 350, cognitive system 300 reduces its discussion tone.

Figure 6:
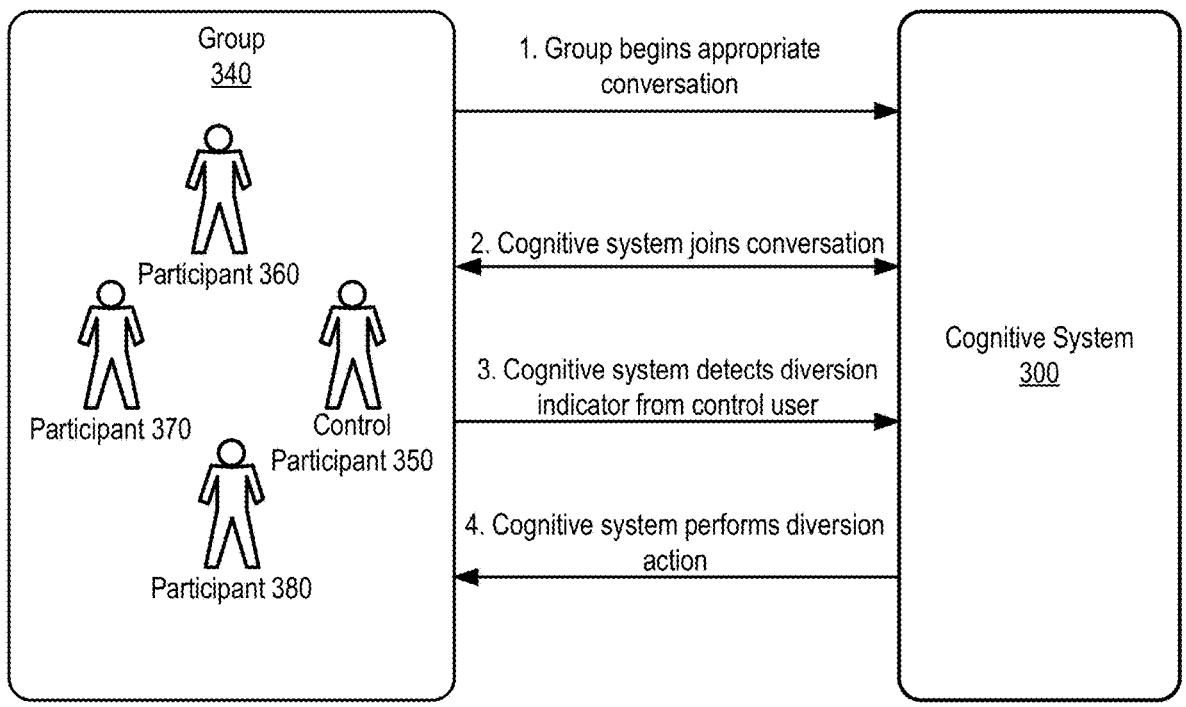
FIG. 6 is an exemplary diagram depicting a cognitive system detecting a diversion indication from a control participant and performing a diversion action accordingly.

FIG. 6 is an exemplary diagram depicting cognitive system 300 detecting a diversion indicator from control participant 350 and performing a diversion action accordingly. At step 1, group 340 begins an appropriate conversation, such as traveling to a foreign country. At step 2, cognitive system 300 identifies control participant 350 and joins in on the conversation, such as by providing information about the foreign country.

At step 3, cognitive system 300 detects that control participant 350 performed a diversion indicator, such as putting a finger to the mouth or speaking a trigger word. For example, control participant 350 may wish to hear more information from group 340's participants and have cognitive system 300 reduce its amount of conversation participation. At step 4, cognitive system 300 identifies the corresponding diversion action and performs the diversion action accordingly, such as by being silent and not contributing to the conversation (see FIGS. 5, 8, and corresponding text for further details).

Figure 7:
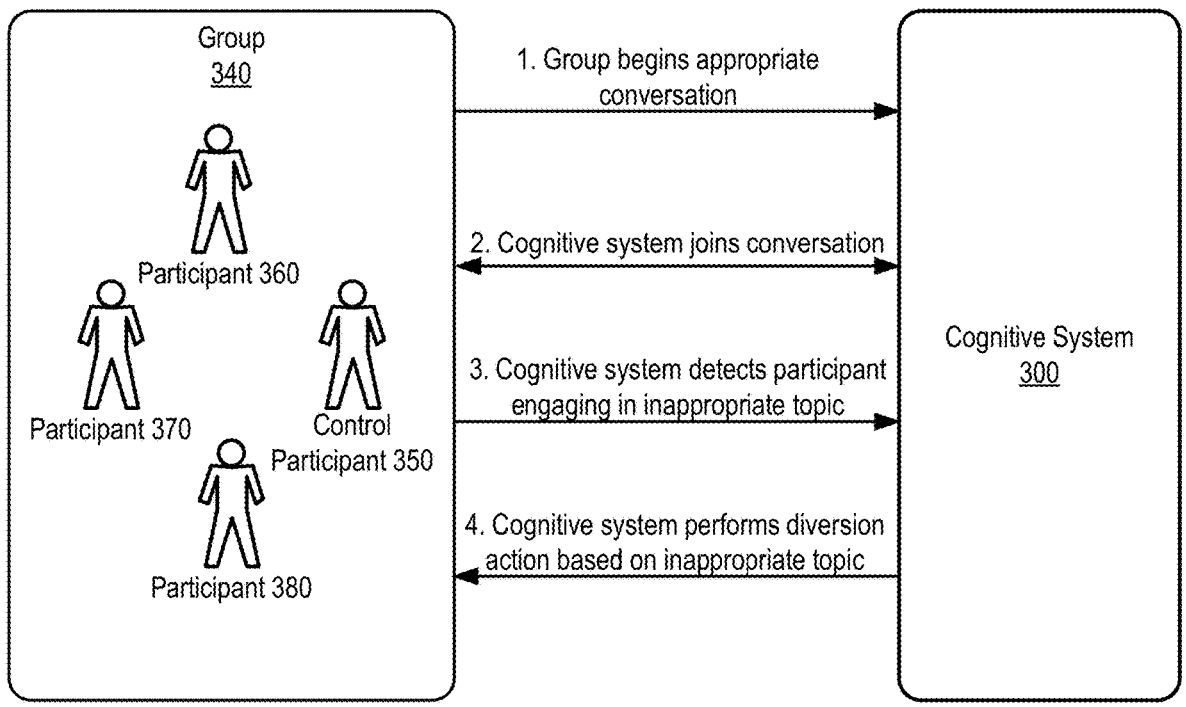
FIG. 7 is an exemplary diagram depicting a cognitive system detecting an inappropriate topic discussion and performing a diversion action accordingly.

FIG. 7 is an exemplary diagram depicting cognitive system 300 detecting an inappropriate topic discussion and performing a diversion action accordingly. At step 1, group 340 begins an appropriate conversation such as traveling to a foreign country. At step 2, cognitive system 300 identifies control participant 350 and joins in on the conversation, such as providing information about the foreign country.

At step 3, cognitive system 300 detects that one of the participants begins to discuss an inappropriate topic, such as engaging a political debate during a business meeting. At step 4, cognitive system 300 identifies the corresponding diversion action and performs the diversion action accordingly, such as by switching subject matter to an appropriate conversation topic (see FIGS. 5, 8, and corresponding text for further details).

Figure 8:
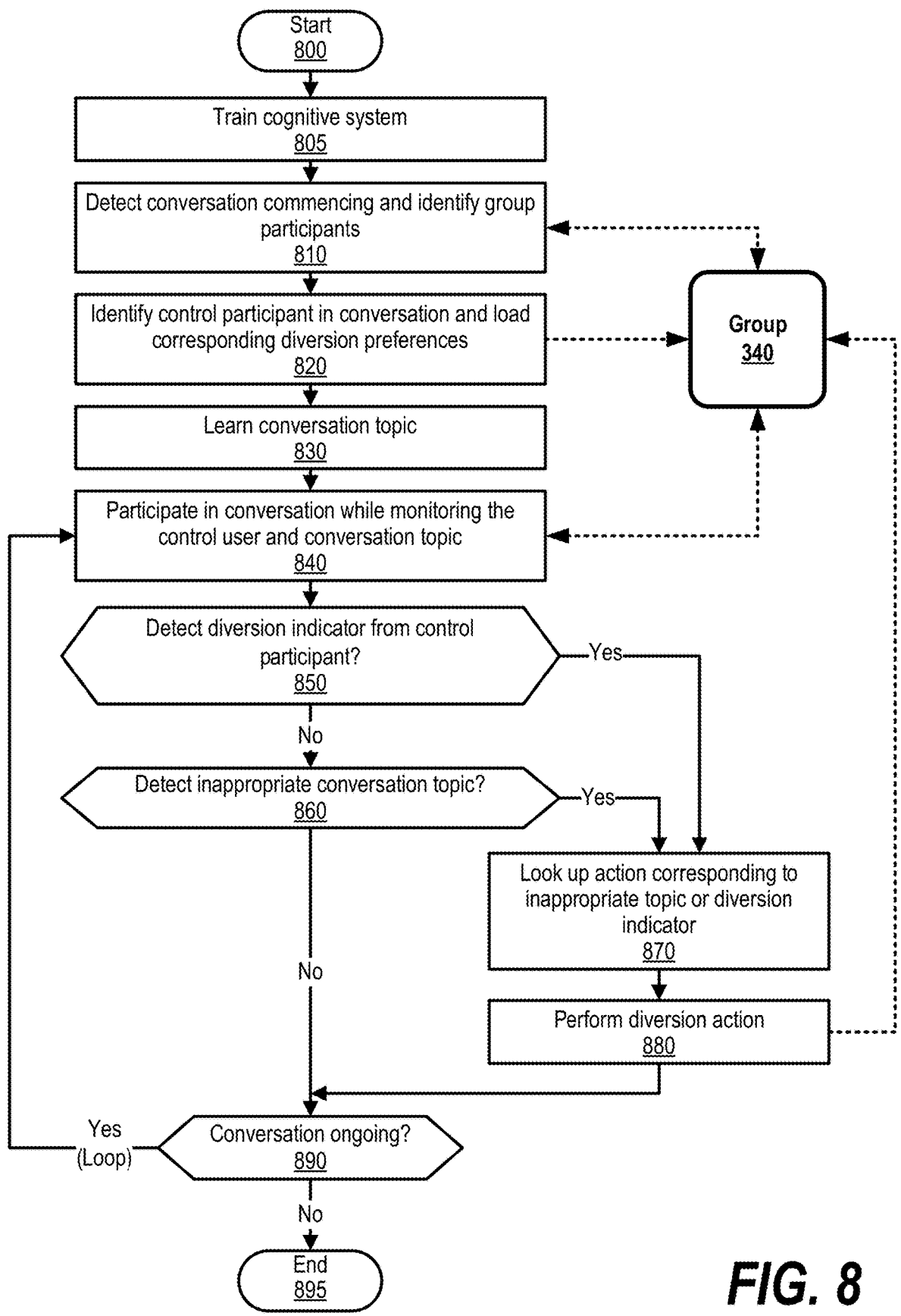
FIG. 8 is an exemplary flowchart showing steps taken by a cognitive system to detect diversion indicators or inappropriate conversation topics and perform diversion actions accordingly.

FIG. 8 is an exemplary flowchart showing steps taken by cognitive system 300 to detect diversion indicators or inappropriate conversation topics and perform diversion actions accordingly. FIG. 8 processing commences at 800 whereupon, at step 805, the process trains cognitive system 300 using various data and control participant characteristics. In one embodiment, the process identifies inappropriate topics based on conversation environments, such as discussing political views during a business meeting.

At step 810, the process detects a conversation commencing with group 340 and the process identifies the group participants. At step 820, the process identifies a control participant (control participant 350) from the group participants and loads corresponding user characteristics settings. In one embodiment, the user characteristic settings include customized gestures, trigger words, sounds, etc. At step 830, the process learns the conversation topic and, at step 840, the process participates in the conversation while monitoring control participant 350 and the conversation flow.

The process determines as to whether control participant 350 performs a diversion indicator, such as performing a physical gesture, speaking a trigger word, etc. (decision 850). If control participant 350 performed a diversion indicator, then decision 850 branches to the 'yes' branch whereupon, at step 870, the process looks up a diversion action corresponding to the diversion indicator and, at step 880, the process performs the corresponding diversion action, such as remaining silent, changing conversation topics, etc. (see FIG. 5 and corresponding text for further details).

On the other hand, if control participant 350 did not perform a diversion indicator, then decision 850 branches to the 'no' branch whereupon the process determines as to whether the conversation is becoming an inappropriate discussion (decision 860). If the process detects an inappropriate conversation topic, then decision 860 branches to the 'yes' branch whereupon, at step 870, the process looks up an action corresponding to the inappropriate conversation topic and, at step 880, the process performs the corresponding diversion action.

On the other hand, if the process does not detect an inappropriate conversation, then decision 860 branches to the 'no' branch. The process determines as to whether the group conversation is ongoing (decision 890). If the group conversation is ongoing, then decision 890 branches to the 'yes' branch which loops back to continue to monitor and participate in the conversation. This looping continues until the conversation terminates, at which point decision 890 branches to the 'no' branch exiting the loop. FIG. 8 processing thereafter ends at 895.

While particular embodiments of the present disclosure have been shown and described, it will be obvious to those skilled in the art that, based upon the teachings herein, that changes and modifications may be made without departing from this disclosure and its broader aspects. Therefore, the appended claims are to encompass within their scope all such changes and modifications as are within the true spirit and scope of this disclosure. Furthermore, it is to be understood that the disclosure is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to disclosures containing only one such element, even when the same claim includes the introductory phrases "one or more" or "at least one" and indefinite articles such as "a" or "an"; the same holds true for the use in the claims of definite articles.

The invention claimed is:

1. A method comprising:
    engaging in a conversation by a cognitive system, wherein the conversation comprises a plurality of participants and each of the plurality of participants listens to a natural language communication from the cognitive system during the conversation;
    selecting a control participant from the plurality of participants based on an organizational hierarchy of the plurality of participants;
    detecting, by the cognitive system, a diversion indicator from the selected control participant during the conversation, wherein the diversion indicator is a trigger to the cognitive system to perform a diversion action;
    retrieving a set of diversion preferences corresponding to the selected control participant;
    selecting a diversion action from the set of diversion preferences based on the diversion indicator; and
    performing the diversion action during the conversation.

2. The method of claim 1 wherein, prior to the engaging of the conversation, the method further comprises:
    learning a unique set of gestures in response to monitoring the selected control participant; and
    storing the unique set of gestures into the set of diversion preferences.

3. The method of claim 1 wherein the detecting of the diversion indicator further comprises:
    determining that the conversation comprises an inappropriate topic;
    in response to determining that the selected control participant invoked the inappropriate topic:
        suppressing the diversion action; and
        revising the set of diversion preferences corresponding to the control participant; and
    in response to determining that one of the plurality of participants other than the selected control participant invoked the inappropriate topic, executing the diversion action.

4. The method of claim 1 further comprising:
    automatically selecting the control participant based on one or more gestures from one or more of the plurality of participants.

5. The method of claim 1 wherein the diversion indicator is selected from the group consisting of a remote control signal, a verbal queue, an emoticon, a text, a gesture, and a biometric measurement.

6. An information handling system comprising:
one or more processors;
a memory coupled to at least one of the processors;
a set of computer program instructions stored in the memory and executed by at least one of the processors in order to perform actions of:
engaging in a conversation by a cognitive system, wherein the conversation comprises a plurality of participants and each of the plurality of participants listens to a natural language communication from the cognitive system during the conversation;
selecting a control participant from the plurality of participants based on an organizational hierarchy of the plurality of participants;
detecting, by the cognitive system, a diversion indicator from the selected control participant during the conversation, wherein the diversion indicator is a trigger to the cognitive system to perform a diversion action;
retrieving a set of diversion preferences corresponding to the selected control participant;
selecting a diversion action from the set of diversion preferences based on the diversion indicator; and
performing the diversion action during the conversation.

7. The information handling system of claim 6 wherein the processors perform additional actions comprising:
learning a unique set of gestures in response to monitoring the selected control participant; and
storing the unique set of gestures into the set of diversion preferences.

8. The information handling system of claim 6 wherein the processors perform additional actions comprising:
determining that the conversation comprises an inappropriate topic;
in response to determining that the selected control participant invoked the inappropriate topic:
suppressing the diversion action; and
revising the set of diversion preferences corresponding to the control participant; and
in response to determining that one of the plurality of participants other than the selected control participant invoked the inappropriate topic, executing the diversion action.

9. The information handling system of claim 6 wherein the processors perform additional actions comprising:
automatically selecting the control participant based on one or more gestures from one or more of the plurality of participants.

10. The information handling system of claim 6 wherein the diversion indicator is selected from the group consisting of a remote control signal, a verbal queue, an emoticon, a text, a gesture, and a biometric measurement.

11. A computer program product stored in a computer readable storage medium, comprising computer program code that, when executed by an information handling system, causes the information handling system to perform actions comprising:
engaging in a conversation by a cognitive system, wherein the conversation comprises a plurality of participants and each of the plurality of participants listens to a natural language communication from the cognitive system during the conversation;
selecting a control participant from the plurality of participants based on an organizational hierarchy of the plurality of participants;
detecting, by the cognitive system, a diversion indicator from the selected control participant during the conversation, wherein the diversion indicator is a trigger to the cognitive system to perform a diversion action;
retrieving a set of diversion preferences corresponding to the selected control participant;
selecting a diversion action from the set of diversion preferences based on the diversion indicator; and
performing the diversion action during the conversation.

12. The computer program product of claim 11 wherein the information handling system performs further actions comprising:
learning a unique set of gestures in response to monitoring the selected control participant; and
storing the unique set of gestures into the set of diversion preferences.

13. The computer program product of claim 11 wherein the information handling system performs further actions comprising:
determining that the conversation comprises an inappropriate topic;
in response to determining that the selected control participant invoked the inappropriate topic:
suppressing the diversion action; and
revising the set of diversion preferences corresponding to the control participant; and
in response to determining that one of the plurality of participants other than the selected control participant invoked the inappropriate topic, executing the diversion action.

* * * * *